United States Patent
Jiao et al.

(10) Patent No.: US 8,325,184 B2
(45) Date of Patent: Dec. 4, 2012

(54) FRAGMENT SHADER BYPASS IN A GRAPHICS PROCESSING UNIT, AND APPARATUS AND METHOD THEREOF

(75) Inventors: Guofang Jiao, San Diego, CA (US); Yun Du, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 852 days.

(21) Appl. No.: 11/855,832

(22) Filed: Sep. 14, 2007

(65) Prior Publication Data
US 2009/0073168 A1    Mar. 19, 2009

(51) Int. Cl.
G06T 15/50 (2011.01)
G06T 1/20 (2006.01)
G06F 15/16 (2006.01)
G06F 7/38 (2006.01)
G09G 5/00 (2006.01)

(52) U.S. Cl. ........ 345/426; 345/501; 345/502; 345/506; 345/582; 708/490

(58) Field of Classification Search .................. None
See application file for complete search history.

(56) References Cited

U.S. PATENT DOCUMENTS

| | | | |
|---|---|---|---|
| 6,425,068 B1 | 7/2002 | Vorbach et al. | |
| 7,091,982 B2 | 8/2006 | Hutchins et al. | |
| 7,256,781 B2 | 8/2007 | Shioya | |
| 7,324,106 B1 * | 1/2008 | Cabral et al. ................. | 345/426 |
| 2006/0053189 A1 * | 3/2006 | Mantor ......................... | 708/490 |
| 2006/0282826 A1 | 12/2006 | Dockser | |
| 2007/0018990 A1 * | 1/2007 | Shreiner ....................... | 345/505 |
| 2007/0091089 A1 * | 4/2007 | Jiao et al. .................... | 345/426 |
| 2008/0189524 A1 * | 8/2008 | Poon et al. ................... | 712/221 |

FOREIGN PATENT DOCUMENTS

| | | |
|---|---|---|
| EP | 1594091 A2 | 11/2005 |
| TW | 200634663 | 10/2006 |
| TW | 200715214 | 4/2007 |
| WO | WO2005101322 | 10/2005 |

OTHER PUBLICATIONS

Jiao, Guofang et al., "Programmable Graphics Processing Element," Pending U.S. Appl. No. 11/735,353.

(Continued)

*Primary Examiner* — Tize Ma
(74) *Attorney, Agent, or Firm* — Matthew J. Evans; James R. Gambale, Jr.

(57) ABSTRACT

Configuration information is used to make a determination to bypass fragment shading by a shader unit of a graphics processing unit, the shader unit capable of performing both vertex shading and fragment shader. Based on the determination, the shader unit performs vertex shading and bypasses fragment shading. A processing element other than the shader unit, such as a pixel blender, can be used to perform some fragment shading. Power is managed to "turn off" power to unused components in a case that fragment shading is bypassed. For example, power can be turned off to a number of arithmetic logic units, the shader unit using the reduced number of arithmetic logic unit to perform vertex shading. At least one register bank of the shader unit can be used as a FIFO buffer storing pixel attribute data for use, with texture data, to fragment shading operations by another processing element.

37 Claims, 4 Drawing Sheets

OTHER PUBLICATIONS

European Search Report—EP08006445—Search Authority—Munich—May 20, 2009.
Hasselgren J et al: "PCU: the programmable culling unit" ACM Transactions on Graphics, vol. 26, No. 3, Jul. 2007, pp. 92-1-92-10, XP002528735, pp. 91-1, right-hand column, line 3-line 25; figure 2, pp. 92-93, left-hand column, line 38-line 43, pp. 92-95, left-hand column, line 1-right-hand column, line 16.
International Search Report and Written Opinion—PCT/US2008/076227, International Search Authority—European Patent Office—Mar. 6, 2009.
Taiwan Search Report—TW097135406—TIPO—Feb. 6, 2012.

* cited by examiner

FRAGMENT SHADER BYPASS IN A GRAPHICS PROCESSING UNIT, AND APPARATUS AND METHOD THEREOF

TECHNICAL FIELD

This disclosure relates to graphics processing units and, more particularly to processing images with graphics processing units.

BACKGROUND

A graphics processing unit (GPU) is a dedicated graphics rendering device used to generate computerized graphics for display on a display device. GPUs are built with a highly-parallel structure that provides more efficient processing than typical, general purpose central processing units (CPUs) for a range of complex algorithms. For example, the complex algorithms may correspond to representations of three-dimensional computerized graphics. In such a case, a GPU can implement a number of primitive graphics operations to create three-dimensional images for display on a display device more quickly than using a CPU to draw the image for display on the display device.

A typical GPU receives an image geometry and uses a pipeline approach to generate graphics which can be output, for example, for display on a display device. A typical graphics pipeline includes a number of stages which operate in parallel, with the output from one stage possibly being used at another stage in the pipeline. For example, a typical graphics pipeline comprises vertex shader, primitive assembly, viewport transformation, primitive setup, rasterization, hidden primitive and pixel rejection, attribute setup, attribute interpolation and fragment shader stages.

A vertex shader is applied to the image geometry for an image and generates vertex coordinates and attributes of vertices within the image geometry. Vertex attributes include, for example, color, normal, and texture coordinates associated with a vertex. Primitive assembly forms primitives, e.g., point, line, and triangle primitives, from the vertices based on the image geometry. Formed primitives can be transformed from one space to another using a transformation, e.g., a viewport transformation which transforms primitives from a normalized device space to a screen space. Primitive setup can be used to determine a primitive's area, edge coefficients, and perform occlusion culling (e.g., backface culling), and 3-D clipping operations.

Rasterization converts primitives into pixels based on the XY coordinates of vertices within the primitives and the number of pixels included in the primitives. Hidden primitive and pixel rejection use the z coordinate of the primitives and/or pixels to determine and reject those primitives and pixels determined to be hidden (e.g., a primitive or pixel located behind another primitive or pixel in the image frame, a transparent primitive or pixel). Attribute setup determines attribute gradients, e.g., a difference between the attribute value at a first pixel and the attribute value at a second pixel within a primitive moving in either a horizontal (X) direction or a vertical (Y) direction, for attributes associated with pixels within a primitive. Attribute interpolation interpolates the attributes over the pixels within a primitive based on the determined attribute gradient values. Interpolated attribute values are sent to the fragment shader for pixel rendering. Results of the fragment shader can be output to a post-processing block and a frame buffer for presentation of the processed image on the display device.

SUMMARY

The present disclosure seeks to address failings in the art and to provide efficiencies in graphics image processing to use one or more programmable processors in accordance with an input image geometry. A GPU can comprise one or more processors that provide powerful processing capabilities for use with the graphics pipeline. Under certain circumstances, however, an application may not need all of the processing capabilities provided by the GPU, e.g., an application may need a less-powerful alternative. In such a case, it would be beneficial to be able to bypass certain portions of the GPU, e.g., the fragment shader, in order to make efficient use of the GPU's resources based on the needs of the application using the GPU, for example.

Disclosed herein is a system, method and apparatus, which uses configuration information to make a determination to bypass, or forego, fragment shading by a shader unit of a graphics processing unit, the shader unit being capable of performing both vertex shading and fragment shader. In accordance with the determination, the shader unit performs vertex shading and bypasses fragment shading. In a case that some fragment shading is to be performed by the graphics processing unit, a processing element other than the shader unit, such as a pixel blender, can be used to perform the fragment shading. Power supplied to arithmetic logic units used by the shader unit can be managed such that power is turned off to a number of the arithmetic logic unit, in a case that the fragment shading is bypassed. The shader unit uses the reduced number of arithmetic logic units to perform vertex shading. Power can also be turned off to other components, such as thread packing buffers and an input bus used to transport information to the shader unit from the thread packing buffer. At least one register bank typically used by the shader unit can be used as a buffer to buffer pixel attribute data for use, along with texture data, in performing fragment shading operations by the other processing element.

In accordance with one or more embodiments of the present disclosure, a programmable processing element, a shader unit, configured to perform both vertex and fragment shading is dynamically "re-configured" to perform vertex shading and to bypass, or forego, fragment shading, based on information provided to the GPU. By virtue of this arrangement, components determined to be "unnecessary" in the re-configured pipeline can be bypassed. Components not used in a case that fragment shading is bypassed can be used for an alternative purpose. Alternatively, power can be conserved by "turning off" power to such components. Other efficiencies can be achieved, such as vertex shader threads having a reduced number of vertices.

In at least one embodiment, a method is described for use with a graphics processing unit, which uses configuration information to make a determination to bypass, or forego, fragment shading in a shader unit capable of performing both vertex shading and fragment shading, performs vertex shading using the shader unit, and bypasses performing fragment shading by the shader unit based on the determination.

In accordance with one or more embodiments, an apparatus is described in which comprises a graphics processing unit and a shader unit. The graphics processing unit comprises a command decoder configured to use configuration information to make a determination to bypass, or forego, fragment shading in the shader unit. The shader unit is capable of performing both vertex shading and fragment shading. The shader unit is configured to perform vertex shading, and bypass performing fragment shading based on the determination.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

Certain embodiments of the present disclosure will now be discussed with reference to the aforementioned figures, wherein like reference numerals refer to like components.

In accordance with one or more embodiments, a system, method and apparatus are disclosed, in which a shader unit is configured in accordance with configuration information provided to a graphics processing unit. Using the configuration information, the shader unit, which is capable of performing both fragment shading and vertex shading, can be configured to perform the vertex shading and to forego the fragment shading. Another processing element, other than the shader unit, can be used to perform some fragment shading. One or more components that would otherwise be used by the shader unit to perform fragment shading can be used for another purpose, or alternatively power can be turned off to components that are not otherwise used.

Figure 1:
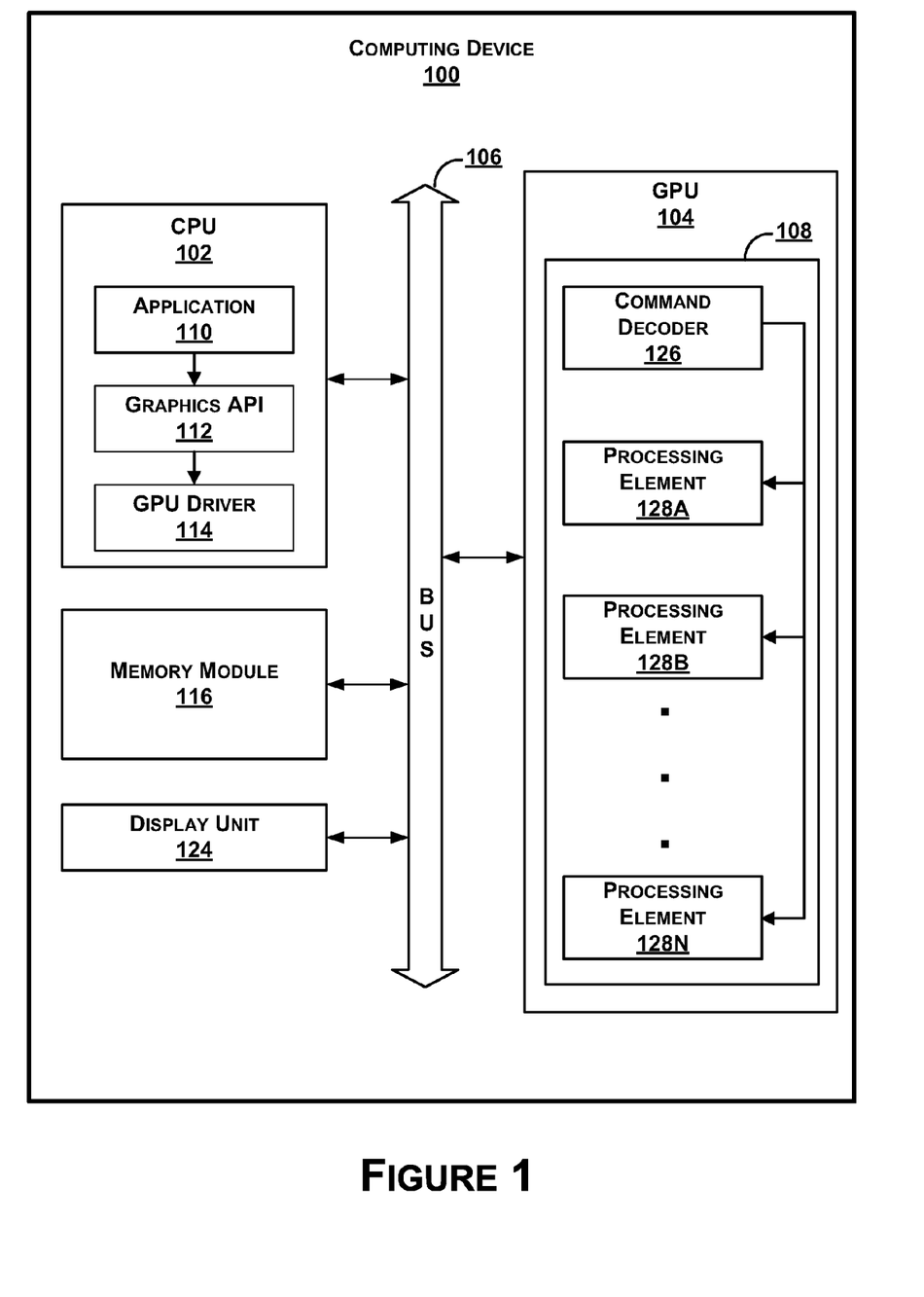
FIG. 1 is a block diagram illustrating an exemplary device including a graphics processing unit for use in accordance with one or more embodiments of the present disclosure.

FIG. 1 is a block diagram illustrating an exemplary computing device 100 that includes a graphics processing unit (GPU) 104 for use in accordance with one or more embodiments of the present disclosure. Computing device 100 may comprise a personal computer, a desktop computer, a laptop computer, a workstation, a video game platform or console, a cellular or satellite radiotelephone, a landline telephone, an Internet telephone, a handheld device such as a portable video game device or a personal digital assistant, a personal music player, a server, an intermediate network device, a mainframe computer, or another type of device that outputs graphical information.

In the example of FIG. 1, computing device 100 includes a central processing unit (CPU) 102, GPU 104, and a memory module 116, e.g., a random access memory (RAM) memory module or modules. CPU 102, GPU 104, and memory module 116 communicate using a bus 106, which can comprise any type of bus or device interconnect now known or later discovered. CPU 102 can comprise a general purpose or a special purpose microprocessor. For example, CPU 102 may comprise a Core 2 Processor provided by Intel Corporation of Santa Clara, Calif. or another type of microprocessor. GPU 104 is a dedicated graphics rendering device. GPU 104 can be integrated into the motherboard of computing device 100, can be present on a graphics card that is installed in a port in the motherboard of computing device 100, or can be otherwise configured to interoperate with computing device 100, for example.

Display unit 124, which is coupled to computing device 100, can comprise a monitor, a television, a projection device, a liquid crystal display, a plasma display panel, a light emitting diode (LED) array, a cathode ray tube display, electronic paper, a surface-conduction electron-emitted display (SED), a laser television display, a nanocrystal display, or another type of display unit, for example. In the example of FIG. 1, display unit 124 can be a part of computing device 100. For instance, display unit 124 can be a screen of a mobile telephone. Alternatively, display unit 124 can be external to computer device 100 and can be in communication with computing device 100 via a wired or wireless communications connection or other connection, for example. By way of a non-limiting example, display unit 124 can be a computer monitor or flat panel display connected to a personal computer via a wired or wireless connection.

A software application 110 can be executed via CPU 102. Software application 110 can comprise any software application capable of executing via CPU 102, such as a video game, a graphical user interface engine, a computer-aided design program for engineering or artistic applications, or another type of software application that uses two-dimensional (2D) or three-dimensional (3D) graphics, by way of non-limiting examples.

When CPU 102 is executing software application 110, software application 110 can invoke subroutines of a graphics processing application programming interface (API) 112, such as any one or more of an OpenVG API, an OpenGL API, a Direct3D API, a Graphics Device Interface (GDI), Quartz, QuickDraw, or another type of 2D or 3D graphics processing API, by way of non-limiting examples.

In accordance with at least one embodiment, when software application 110 invokes a subroutine of graphics processing API 112, graphics processing API 112 invokes one or more subroutines of a GPU driver 114, which execute via CPU 102 on computing device 100. GPU driver 114 can comprise a set of software and/or firmware instructions that provide an interface between graphics processing API 112 and GPU 104, for example. When graphics processing API 112 invokes a subroutine of GPU driver 114, GPU driver 114 formulates and issues a command that causes GPU 104 to generate displayable graphics information. For example, when graphics processing API 112 invokes a subroutine of GPU driver 114 to render a batch of graphics primitives, GPU driver 114 provides GPU 104 with a processing configuration, which GPU 104 uses to render the batch of graphics primitives. GPU 104 renders the batch of graphics primitives, and outputs a raster image of the graphics primitives, for example.

A command formulated by GPU driver 114 can identify graphics processing configuration(s) that GPU 104 is to use to perform the command, which configuration(s) can identify a set of instructions to be executed by GPU 104, a set of state register values, and other types of information that GPU 104 might need to perform the command.

In a case that GPU driver 114 stores the graphics processing configuration(s) in memory 116, GPU driver 114 can reference the storage locations in memory module 116 corresponding to the graphics processing configuration(s) in the command formulated by GPU driver 114. When GPU 104 receives the command, GPU 104 can retrieve from memory 116 the graphics processing configuration(s) referenced in the command received from GPU driver 114.

In accordance with at least one embodiment, command decoder 126 of GPU 104 decodes the command from GPU driver 114 and configures one or more of processing elements 128 to perform the command. By way of a non-limiting example, command decoder 126 retrieves the graphics processing configuration(s) from memory 116, and loads a set of instructions identified by the graphics processing configuration(s) into processing element(s) 128. Command decoder 126 can also be configured to provide input data to one or more processing elements 128.

In accordance with one or more embodiments, processing elements 128 implement a graphics pipeline 108. In accordance with such embodiments, processing elements 128 can implement graphics pipeline 108 in a parallel mode. In a parallel mode, processing elements 128 can operate on data in parallel, with output from processing element 128 being used as input to another processing element 128. By way of a non-limiting example, processing element 128A performs a first graphics operation on a first set of initial input data received from command decoder 126 and outputs a first set of intermediate results to processing element 128B. The initial input data can comprise data corresponding to one or more vertices, which data can comprise coordinate and attribute data, for example. Vertex coordinates identify a location within an image based on, for example, a four-dimensional coordinate system with X, Y, and Z (width, height, and depth) coordinates, and a W coordinate that comprises a perspective parameter. Vertex attributes can include color, normal, and texture coordinates associated with a vertex, for example. Processing element 128B can perform another graphics operation on the first set of intermediate results output by processing element 128A, and output a second set of intermediate results to another of the processing element 128, and so on. While processing element 128B is performing the second graphics operation, processing element 128A can be performing the first graphics operation on a second set of initial input data received from command decoder 126.

Processing elements 128 can continue in this manner until processing element 128N outputs a pixel object to one or more buffers in memory module 116, or output this new pixel object to some other destination. A pixel object is data that describes a pixel. Each pixel object may specify multiple color values, and can specify a transparency level of the pixel. In some circumstances, a pixel object may specify a first color in a first color format and a second color in a second color format.

In accordance with one or more embodiments of the disclosure, one of processing elements 128 comprises a shader unit that can be configured to perform one or more vertex shading operations, each of which operate on vertex data, and to perform one or more fragment shading operations, each of which operate on pixel data. Thus, in accordance with one or more embodiments, a processing element 128 can be configured as a unified shader unit, which is capable of performing as a vertex shader that operates on vertex data, and is further capable of performing as a fragment shader that operates on pixel data. In accordance with one or more embodiments, the shader unit is a programmable processing element.

Figure 2:
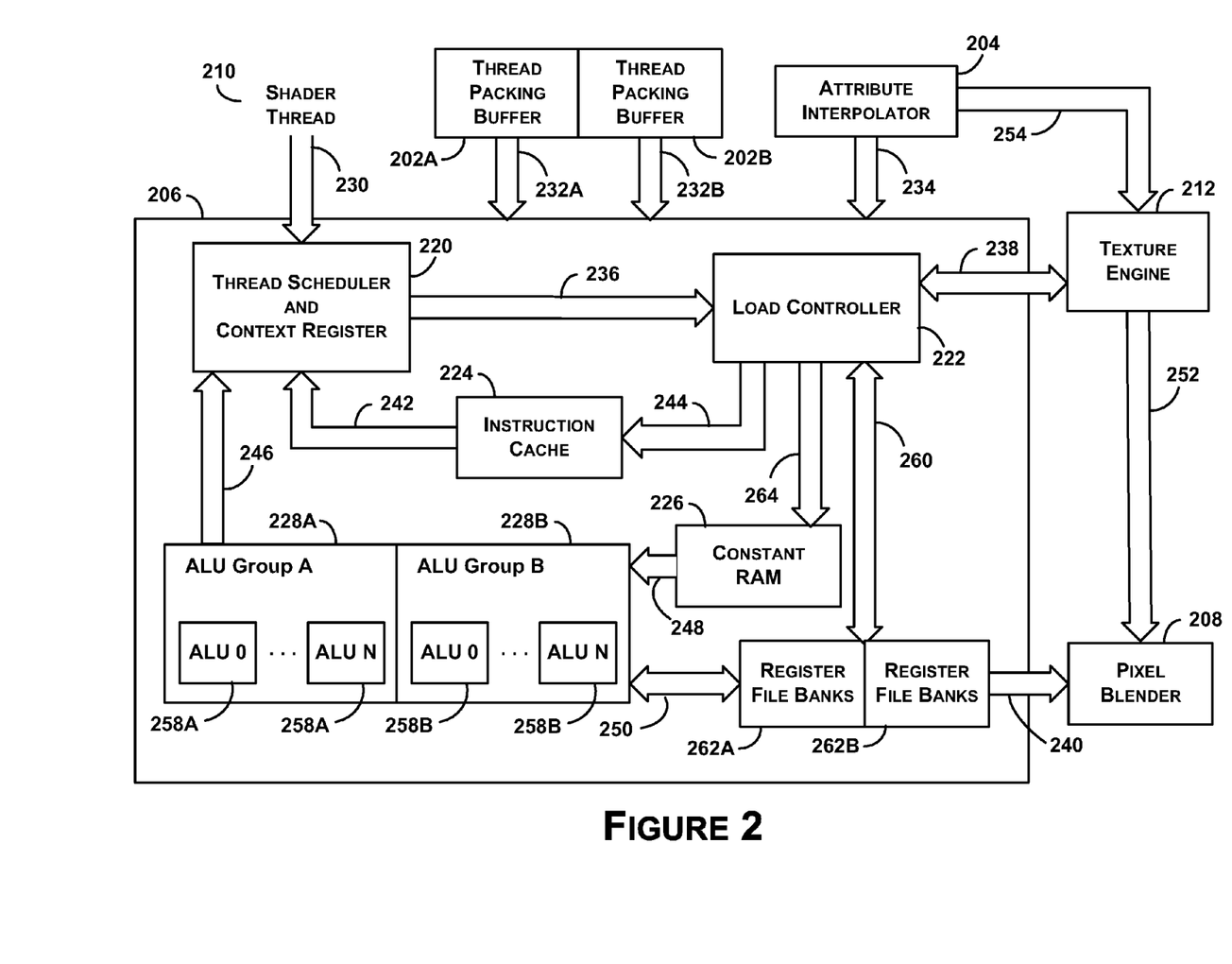
FIG. 2 provides an overview of components of a shader unit capable of implementing vertex shader and fragment shader processing elements in accordance with one or more embodiments of the present disclosure.

FIG. 2 provides an overview of components of a shader unit capable of implementing vertex shader and fragment shader processing elements in accordance with one or more embodiments of the present disclosure. As is described in more detail herein, command decoder 126 determines what if any shading operations are to be performed using shader unit 206 based on the graphics processing configuration(s) retrieved from memory module 116. In some cases, application 110 may not require any, or very minimal fragment shading. In a case that minimal fragment shading is needed, GPU 104 can configure a processing element 128 other than shader unit 206 to perform the minimal fragment shading, as is further described herein.

In accordance with one or more embodiments of the present disclosure, GPU 104 can be configured such that shader unit 206 is used to process vertex data of vertex shader threads executed using shader unit 206. In addition and as is disclosed herein, other processing elements 128 of GPU 104 can be configured to accommodate an absence of a fragment shader processing element.

Shader unit 206 comprises two or more arithmetic logic unit (ALU) groups 228, each of which comprises a number of ALUs 258. Each ALU 258 performs an operation on one or more operands in conformance with an instruction fetched from instruction cache 224. The operands can comprise one or more constants retrieved from RAM 226 via a communication line 248, and/or one or more temporary stored values retrieved from a register in one of registers banks 262, via a communication line 250. Communication lines, such as communication lines 248 and 250, identified herein can be a bus, for example. Communication lines internal to shader unit 206 can comprise a single bus, or multiple buses. In accordance with one or more embodiments, load control module, also referred to herein as a load controller, 222, controls storage of constants to RAM 226 (via communication line 264), and/or storage of temporary values to and retrieval of temporary values from register file banks 262 (via communication line 260). In accordance with one or more embodiments, RAM 226 can comprise some portion of memory module 116, for example.

Constants stored in RAM 226 can be global values for use by shader threads 210. By way of a non-limiting example, under the control of load control module 222, RAM 226 can store constants for use with all of the shader threads 210 used to process a command received from GPU driver 114. Register file banks 262, access to which is also under the control of load controller 222, can comprise a bank of registers used to temporarily store values. A set, or bank, of registers can be used to temporarily store values for use with a given one of the shader threads 210. ALUs 258 can access (e.g., store or retrieve) temporary values in register bank 262 via communication line 250.

In accordance with one or more embodiments, the shader unit 206 further comprises a thread scheduler and context register (TSCR) 220, which operates to schedule shader threads 210 and to synchronize the thread switch with load control module 222 in accordance with information contained in a context register for a given shader thread 210. Shader threads 210 scheduled by TSCR 220 can be vertex and fragment shader threads. A vertex shader thread 210 is one of a number of threads which implement a vertex shader used in graphics pipeline 108, each vertex shader thread 210 comprises a number of vertex shading operations that can be performed by the shader unit 206 to provide a vertex shader for the graphics pipeline 108. Similarly, a fragment shader thread 210 is one of a number of threads which implement a fragment shader, each fragment shader thread 210 comprising a number of fragment shading operations that can be performed by the shader unit 206 to provide a fragment shader for the graphics pipeline 108. In accordance with embodiments of the present disclosure, shader unit 206 is configured to schedule vertex shader threads 210. The shade unit 206 is further configured to schedule fragment shader threads 210 based on information obtained from GPU driver 114.

TSCR 220 schedules a shader thread 210 for execution and communicates with load control module 222, via communication line 236, so that a context for the scheduled shader thread 210 can be loaded by load controller 222. A shader thread's 210 context includes the instructions to be processed by shader unit 206 in connection with the shader thread 210. Load controller 222 controls instruction cache 224 so that the instructions to be executed by ALUs 258 for the scheduled shader thread 210 are loaded in instruction cache 224 and pointers to RAM 226 and registers in register file banks 262 point to the locations/registers that store values (global and temporary) corresponding to the scheduled shader thread 210. As such, instructions fetched from instruction cache 224 for execution in connection with a scheduled shader thread 210 operate in a context of the scheduled shader thread 210. For example, an instruction is fetched from instruction cache 224 and executed by one or more of ALUs 258 for the scheduled shader thread 210. The scheduled shader thread 210 can use one or more temporary values from a register file bank 262 associated with the scheduled shader thread 210 and/or one or more global values from RAM 226 associated with the scheduled shader thread 210 in accordance with the fetched instruction.

Thread packing buffer 202 can store data for a shader thread 210. The shader instructions or program for a scheduled shader thread 210 can be pre-loaded or runtime-loaded into instruction cache 224 by load controller 222 from external memory or L2 cache in GPU pipeline 108 via a bus (not shown in FIG. 2), and data can be loaded into the register bank 262 corresponding to the scheduled shader thread 210, based on the information provided to load controller 222 by TSCR 220, which identifies the scheduled shader thread 210. Constant RAM 226 stores values, such as global values available to all of the shader threads 210. Load control can request texture samples from texture engine 212 for use with a scheduled shader thread 210.

In accordance with one or more embodiments of the present disclosure, shader unit 206 operates at a clock rate that may be faster than the graphics pipeline's 108 clock rate/speed. An asynchronous interface is used to allow communicate shader unit 206 to communicate with a component external to shader unit 206. Communications lines 230, 232, 234, 238 and 240 can comprise one or more communication bus structures, with which shader unit 206 communicates with one or more external components, for example.

While shader unit 206 can operate at a higher clock speed than other graphics pipeline components, it need not. A higher clock rate is optionally used, for example, to achieve a throughput of shader operations for the vertex shader and/or the fragment shader to match other graphics pipeline throughput, if desired. Alternatively, if the shader computation workload is light, the shader unit 206 clock speed can be lower than the graphics pipeline 108 clock speed. When fragment shading is bypassed in accordance with embodiments of the present disclosure, shader unit 206 may be used exclusively for vertex shader operations, such that even with a reduced number of vertices per thread and a reduced number of ALUs 258, e.g., the ALUs 258 in group 228A, a vertex shading throughput similar to that achieved with a full complement of ALUs 258 can be achieved using the reduced number of ALUs 258 in a unit time period, e.g., with shader unit 206 scheduling a number of vertex shader threads that use the reduced number of the shader unit's 206 ALUs 258. When fragment shading is not bypassed, shader unit 206 is shared by both vertex shader and fragment shader operations, e.g., using the full complement of ALUs 258 and larger thread sizes (e.g., more vertices per thread) to maintain an appropriate throughput.

By way of a non-limiting example, in each clock cycle of shader unit 206, ALUs 258 in both ALU groups 228A and 228B can operate on a number of vertices, or pixels, equal to the number of ALUs 258 in ALU groups 228A and 228B. For example, where N is equal to two, ALU groups 228A and 228B can operate on four vertices, or pixels, per clock cycle of shader unit 206. In a case that the scheduled shader thread 210 is a vertex shader thread 210, four vertices in shader thread 210 are operated on, each by an ALU 258 from ALU group 228A or 228B or both 228A and 228B, during a given clock cycle of shader unit 206. Similarly, in a case that the scheduled shader thread 210 is a fragment shader thread 210, four pixels in fragment shader thread 210 are operated on, each by an ALU 258 from ALU group 228A or 228B or both 228A and 228B.

In the example shown in FIG. 2, ALU groups 228A and 228B have the same number of ALUs 258. In accordance with one or more embodiments, ALU group 228A may have a different number of ALUs 258 than the number of ALUs 258 in ALU group 228B. Furthermore, in accordance with embodiments of the present disclosure, the number of vertex shading operations (and vertices processed) need not be the same as the number of fragment shading operations (and pixels processed). In some cases, for example, the workload ratio between vertex shading operations and fragment shading operations can be 1:4, 1:2, 1:1, 2:1, or any other ratio. Similarly, register file bank 262A can differ in size from that of register file banks 262B, the size of both of which can be configured statically or dynamically. In general, in a unit time period and in a case that the workload for the vertex shading operations is designated as "NV" for the number of vertices processed and the workload for fragment shading operations is designated as "MP" for the number of pixels processed, the shader unit 206 finishes NV vertices and MP pixels in a time sharing fashion during the unit time period. As an alternative to time sharing, in accordance with another configuration or embodiment, ALU group 228A may be scheduled to operate on vertex shader threads 210 while ALU group 228B may be scheduled in parallel to operate on fragment shader threads 210 at a shader unit 206 clock cycle.

As discussed above, GPU 104, e.g., command decoder 126 of GPU 104, can determine that no, or minimal, fragment shading is needed, based on information provided by application 110, for example. In accordance with one or more embodiments, in a case that it is determined that no, or minimal, fragment shading is needed, fragment shading operations are bypassed in shader unit 206, and shader unit 206 need not process any fragment shader threads 210. Furthermore and in accordance with one or more such embodiments, the number of vertices associated with each vertex shader threads 210 can be reduced, as discussed in more detail below, and it is possible to operate shader unit 206 using a reduced number of ALUs 258, while still generating the same level of output per clock cycle of the graphics pipeline 108. In so doing, power conservation can be achieved without any noticeable degradation in performance of, or change in a level of output by, shader unit 206. In a case that no or minimal fragment shading is indicated and shader unit 206 implements vertex shading operations to the exclusion of fragment shading operations, to the extent they would be used in connection with fragment shading operations, thread packing buffer 202 and corresponding input bus 232, e.g., thread packing buffer 202B and input bus 232B, can be disabled, and power to these components can be turned off. In addition, the register file banks 262 used by fragment shader threads 210 are available to store attribute data, e.g., color data, output by attribute interpolator 204. In so doing, it is possible to use register file banks 262B, for example, as a first in, first out (FIFO) buffer to store colors, or other data, for input to pixel blender 208. Use of the register file banks, e.g., register file banks 262B, as a FIFO can cover latency of some texture loading/retrieval performed via texture engine 212, for example.

In accordance with one or more embodiments, a power management unit, or power controller, can be used to control power supplied to components of shader unit 206, including ALUs 258, as well as power to components external to shader unit 206, e.g., thread packing buffers 202 and input buses 232. In a case that a component, e.g., an ALU 258, thread packing buffer 202, input bus 232, etc., is not used by shader unit 206, the power management unit can adjust, e.g., turn off, the power supplied to the component. In so doing, components that are not used in a case that shader unit 206 performs vertex shading operations to the exclusion of fragment shading operations, power to unused one or more components can be reduced or completely shut off, to achieve a reduced level of power consumption by the GPU 104. In accordance with such embodiments, the power management unit can control power supplied to one component independent of the other components. By way of a non-limiting example, the power management unit can control power to each of the ALUs 258 independent of the other ALUs 258. In this example, the power management unit operates to turn a power supply off to one or more of ALUs 258A and 258B and to supply power to other of ALUs 258A and 258B. Alternatively, in a case that the component comprises an ALU group, the power management unit can control power supplied to an ALU group 228 independent of other ones of the ALU groups 228. By way of a non-limiting example, the power management unit can control power to the ALUs 258A in ALU group 228A independent of the ALUs 258B in ALU group 228B. In this example, the power management unit operates to turn a power supply off to the ALUs 258A and to supply power the ALUs 258B of ALU group 228B.

In a case that minimal fragment shading is needed, GPU 104 can configure a processing element 128 other than shader unit 206 to perform the fragment shading. In accordance with one or more embodiments, the minimal fragment shading needed can be performed by a processing element 128 that can be programmed to perform the fragment shading operations, as is described in more detail below. In so doing, the resources of the shader unit 210 can be focused on the more involved shading operations, and resources of shader unit 210 not needed to perform the more involved shading operations being powered down.

In a case that shader unit 206 is configured to not perform fragment shading operations, TSCR 220 schedules vertex shader threads 210, each of which can include a reduced number of vertices. More particularly, shader unit 206 is configured to process vertices using a reduced number of ALUs 258, while still generating the same level of output (e.g., NV vertices) in the same unit time period, as shader unit 206 schedules vertex shader threads exclusively to operate on ALU group 228A in every unit time period that shader unit 203 is so configured.

Embodiments of the present disclosure are described by way of a non-limiting example, in which the number of ALUs 258 per ALU group 228 is two. In such a case, shader unit 206, and in particular TSCR 220, can schedule a number of vertex shader threads 210 in a unit time period. Vertices associated with each vertex shader thread 210 scheduled by TSCR 220 are operated on using one of ALU groups 228A and 228B, e.g., ALU group 228A. In a first clock cycle of shader unit 206, TSCR 220 schedules a first vertex shader thread 210, which results in a first set of two vertices corresponding to the first vertex shader thread 210 being processed by shader unit 206 using ALU group 228A. In a second clock cycle of shader unit 206, TSCR 220 schedules a second vertex shader thread 210, which results in another two vertices, the vertices in the second vertex shader thread 210, being processing by shader unit 206 and ALU group 228. Thus, in a unit time period, a set of vertices comprising the expected number of vertices are processed using half the ALUs 258 of shader unit 206. By virtue of this arrangement, a number of ALUs 258 can be bypassed, and the power otherwise consumed to operate the bypassed ALUs 258 can be conserved by reducing or completely shutting off power to the unused ALUs 258.

Figure 3:
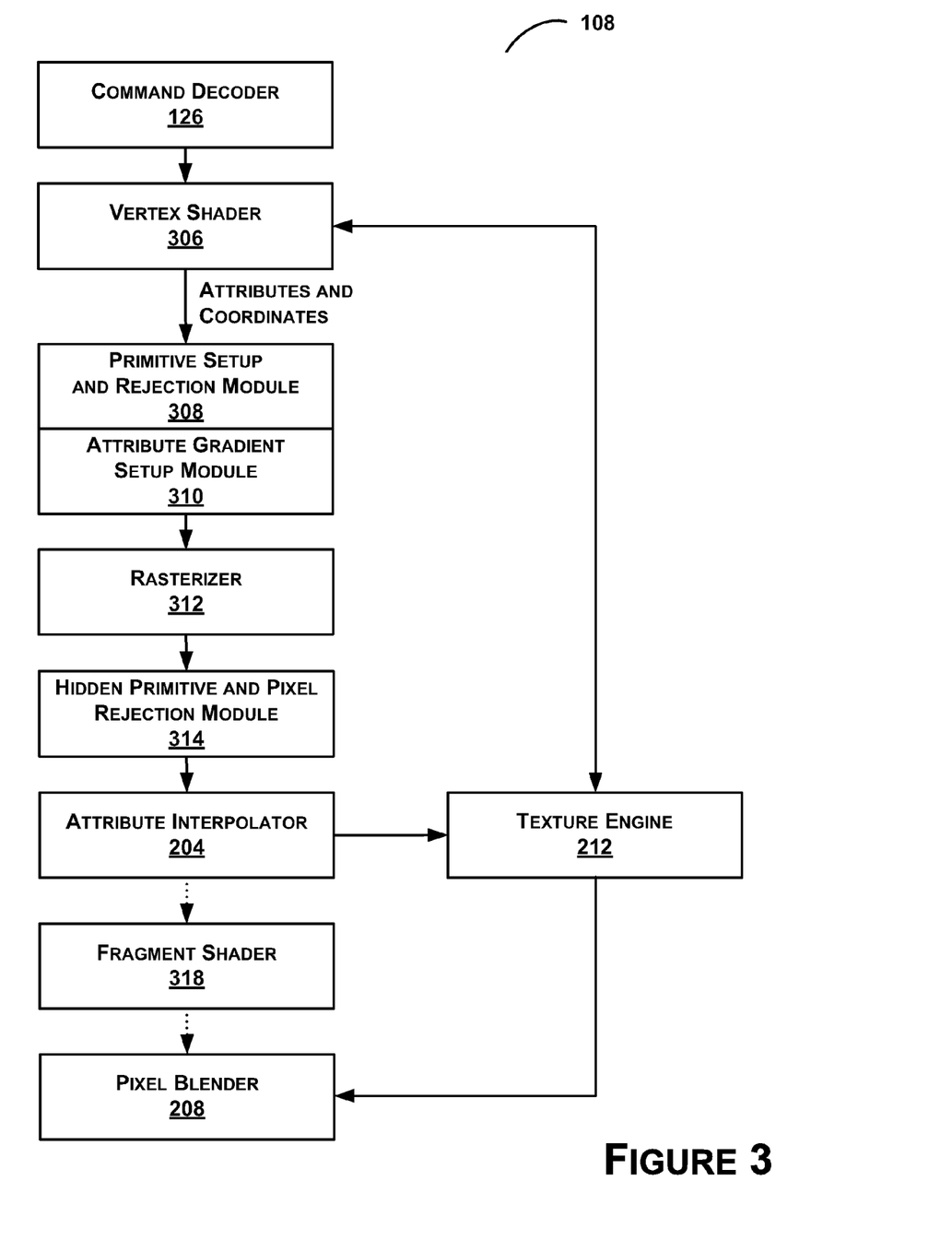
FIG. 3 provides an example of a graphics pipeline of a graphics processing unit for use in accordance with one or more embodiments of the present disclosure.

FIG. 3 provides an example of a graphics pipeline 108 of GPU 104 for use in accordance with one or more embodiments of the present disclosure. As shown in FIG. 3, graphics pipeline 108 includes command decoder 126 of FIG. 1, and attribute interpolator 204, pixel blender 208 and texture engine 212 of FIG. 2. Vertex shader 306 can be implemented using shader unit 206. In the example shown in FIG. 3, in accordance with one or more embodiments, fragment shader 318, which would otherwise be implemented using shader unit 206 in graphics pipeline 108, is bypassed. In accordance with embodiments disclosed herein, in case that fragment shader 318 is bypassed, input that would have been forwarded to fragment shader, e.g., textures output by texture engine 212 and color and attribute data output by attribute interpolator 204, is diverted to pixel blender 208. In a case that some fragment shading is determined to be needed that is not to be performed by shader unit 206, pixel blender 208 can be configured to perform the fragment shading in addition to its blending operations.

In addition to vertex shader 306, graphics pipeline 108 of GPU 104 includes primitive setup and rejection module 308, attribute gradient setup module 310, rasterizer 312, hidden primitive and pixel rejection module 314, attribute interpolator 204, pixel blender 208, and texture engine 212.

Vertex shader 306 determines surface properties of the image at vertices within the image. In this way, vertex shader 306 generates vertex coordinates and attributes of each of the vertices within the image geometry. The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. The vertex attributes, for example, may include color, normal, and texture coordinates associated with a vertex. In accordance with embodiments disclosed herein, vertex shader 306 within GPU 104 makes the attributes and/or coordinates for vertices processed by vertex shader 306 to other stages of the pipeline 108.

Primitive setup and rejection module 308, attribute gradient setup module 310, rasterizer 312, hidden primitive and pixel rejection module 314, and attribute interpolator 204, each use either vertex coordinates or vertex attributes to process the image geometry. Primitive setup and rejection module 308 assembles primitives with one or more vertices within the image geometry, applies perspective projection and viewport transformations on primitive vertices and determines edge coefficients for each primitive edge. In addition, primitive setup and rejection module 308 can examine a primitive to determine whether or not to reject the primitive, e.g., by performing scissoring or backface culling using the XY coordinates of a primitive's vertices to determine whether or not to reject the primitive or a portion thereof from consideration for a given image frame. For example, a primitive or primitive portion can be determined to be invisible, e.g., located on a backside of an object within the image frame, in which case the primitive or portion thereof can be rejected by the primitive setup and rejection module 308.

Attribute gradient setup module 310 computes gradients of attributes associated with the primitives for the image geometry. In accordance with embodiments presently disclosed, an attribute gradient comprises a difference between the attribute value at a first pixel and the attribute value at a second pixel within a primitive moving in either a horizontal (X) direction or a vertical (Y) direction. Attribute gradient setup module 310 uses vertex attributes to compute the attribute gradients.

Once the attribute gradient values are computed, rasterizer 312 converts the primitives for the image geometry into pixels based on the XY coordinates of each of the vertices within the primitives and the number of pixels included in the primitives. Hidden primitive and pixel rejection module 314 rejects hidden primitives and hidden pixels within the primitives, e.g., using the early depth and stencil test based on the Z coordinates of the vertices within the primitives. Primitives or pixels within primitives can be considered hidden, and be rejected from consideration during processing of a specific frame of the image, for example, when the primitives or the pixels within primitives are located behind another object within the image frame.

Attribute interpolator 204 interpolates the attributes over pixels within the primitives based on the attribute gradient values. Fragment shader threads are packed at the end of processing by attribute interpolator 204 and communicated to shader unit 206 via communication line 234. Attribute interpolator 204 can disregard attributes of vertices associated with rejected primitives within the image geometry. In accordance with one or more embodiments, interpolated attribute values become input to pixel blender 208, bypassing fragment shader 318. Results of pixel blender 208 can be output for presentation of the processed image using an output device, such as display unit 124.

As illustrated in the example of FIG. 3, output from the vertex shader 306, e.g., texture data generated by vertex shader 306, can output to the texture engine 212, for use in subsequent processing by graphics pipeline 108. In addition, vertex shader 306 can submit a texture data lookup request to texture engine 212, to retrieve texture data for use with vertex shader 306. Referring to FIG. 2, load control module 222 can sample the texture data for the vertex shader threads 210, via texture engine 212, for example.

In a case that fragment shader 318 is performed in graphics pipeline 108 (e.g., it is not bypassed), attribute interpolator 204, forwards its output, e.g., pixel attribute/color data, to fragment shader 318. In addition, attribute interpolator 204 submits a request for initial textures to texture engine 212. In response, texture engine 212 obtains the requested textures and forwards them to the register file banks 262 via load controller 222 and communication lines 238 and 260 for use by shader threads 210 implementing fragment shader 318.

Alternatively, in a case that fragment shader 318 is bypassed and some minimal fragment shading is to be performed, a request for initial textures is submitted to texture engine 212 from attribute interpolator 204. In response, texture engine 212 forwards the requested textures to pixel blender 208, which uses the texture data in the fragment shading operations performed by pixel blender 208. Referring again to FIG. 2, input/output (I/O) bus 238 passes textures, e.g., dependent textures comprising texture results from a previous operation, to and from texture engine 212, via load controller 222. Attribute interpolator 204 requests initial textures from texture engine 212 via communication line 254. In response, texture engine 212 forwards the initial textures to pixel blender 208 via communication line 252. As discussed above, register file banks, e.g., register file banks 262B, not used by fragment shader threads 210 can be used as a FIFO buffer to store color values, and other data such as non-texture data, output by attribute interpolator 204 for input to pixel blender 208. The data stored in the FIFO buffer comprising some portion of register file banks 262 is input to pixel blender via communication line 240. Dotted lines are shown between attribute interpolator 204 and fragment shader 318 and between fragment shader 318 and pixel blender 208 in FIG. 3 to further illustrate that when shader unit 206 bypasses fragment shading, attribute/color values are sent via register file banks 262 of shader unit 206 to pixel blender 208.

During initial processing by pixel blender 208, the color data from the register file banks 262 FIFO is synchronized with the initial textures received by pixel blender 208 from texture engine 212. In accordance with one or more embodiments and in a case that some fragment shading is to be performed, e.g., texture combining, pixel blender 208 is configured to perform, or emulate, the fragment shading functionality or texture combining functionality. The pixel blender 208 is further configured to perform blending, e.g., alpha blending, on the result of the fragment shading operation(s) performed by pixel blender 208.

In accordance to one or more of such embodiments disclosed herein, a programmable graphics processing element (PGPE) can be used to implement one or more of program elements 128. For example, in accordance with such embodiments, a PGPE can be used to implement pixel blender 208, which is programmed to perform blending as well as fragment shading not performed by shader unit 206, if any is needed. In accordance with one or more of such embodiments, the PGPE can be, for example, a PGPE as described in U.S. application Ser. No. 11/735,353, entitled "Programmable Graphics Processing Element", the contents of which are incorporated herein by reference.

Figure 4:
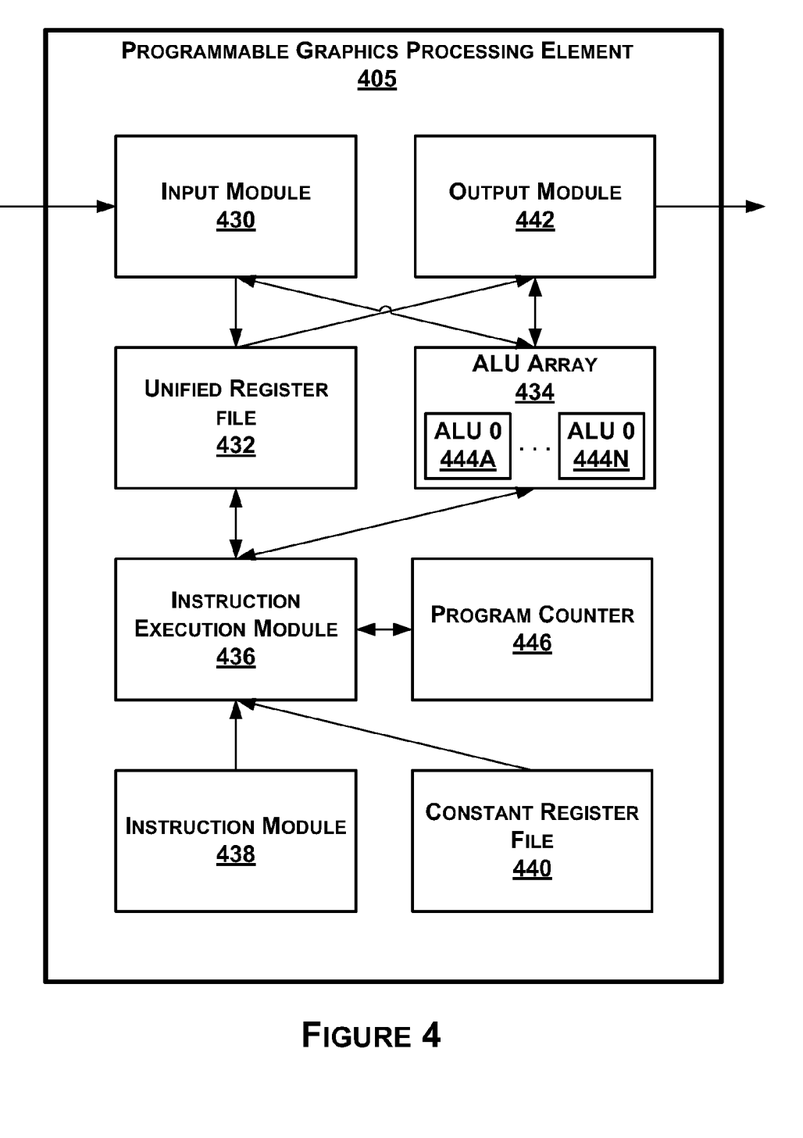
FIG. 4 provides an example block diagram illustrating a programmable graphics processing element for use with one or more embodiments of the present disclosure.

In accordance with one or more embodiments, the PGPE can execute an instruction set, which can vary depending on the functionality needed to be performed using PGPE. FIG. 4 is a block diagram illustrating an exemplary PGPE 405. As illustrated in the example of FIG. 4, PGPE 405 comprises an input module 430, which receives data corresponding to a pixel, also referred to herein as a pixel object, as input. For example, PGPE 405 can receive one or more pixel objects from one or more of processing elements 128, memory module 116, register file banks 262, etc.

In accordance with one or more embodiments, input module 430 uses one or more arithmetic logic units (ALUs) 444 to perform format conversions. In the example shown, ALU(s) 444 is a part of an ALU array, ALU 434. Each of the ALUs 444 is capable of performing arithmetic operations, such as a single-multiplication, double-multiplication, 2D dot product, maximum operation, register copy operation, gamma-encoding, gamma-decoding operation, and/or other types of operations, including other types of arithmetic operations, by way of a few non-limiting examples. ALU array 434 can use an 8-bit integer, 10-bit integer, 16-bit floating point, 32-bit floating point, etc. value per color component, for example. The ALUs 444 can be single threaded or multi-threaded.

Input module 430 can store intermediate values, e.g., a result of a format conversion, in a register in a unified register file 432, e.g., a register file comprises a number of hardware registers. Depending on the implementation of ALU array 434, for example, each hardware register can store four 8-bit integers that represent color components, four 10-bit integers that represent color components, four 16-bit floating point values that represent color components, etc.

An instruction execution module (IEM) 436 in PGPE 405 fetches one or more instructions identified using program counter 446 from an instruction module 438. Instruction module 438 is capable of storing a number of instructions, e.g., using hardware registers, synchronized random access memory (SRAM), etc. IEM 436 decodes the fetched instruction, and fetches the operands as specified by the decoded instruction. IEM 436 can fetch the operands from unified register file 432 and/or constant register file 440, for example. As with register file 432, constant register file 440 can comprise hardware registers and/or an SRAM, for example. Constant register file 440 can store a blending factor, a pattern for a legacy 2D Raster Operation (ROP), or other constant values, by way of non-limiting examples.

An instruction can cause IEM 436 to extract one or more color components from pixel objects stored in one or more registers in unified register file 432 and to use these color components as operands. For example, pixel objects stored in a register in unified register file 432 can be formatted in the RGBA format having eight bits per color component. When a pixel object is formatted in the RGBA format, bits 0 through 7 may represent the red component, bits 8 through 15 may represent the green component, bits 16 through 23 may represent the blue component, and bits 24 through 31 may represent the alpha component. The alpha component of a pixel represents the level of transparency of the pixel. Using this example and in accordance with one exemplary instruction, IEM 436 extracts the red component of the pixel object and uses the red component as an operand, e.g., bits 0 through 7 from the pixel object. Other instructions can instruct IEM 436 to extract different or multiple components, e.g., color and/or alpha components, from a pixel object. In another example, an instruction in a depth/stencil graphics operation may instruct IEM 436 to extract a stencil value or a Z value from a pixel object in one of the registers in unified register file 432.

An instruction can instruct IEM 436 to modify an operand prior to providing the operand to ALU array 434. In some instances, an instruction can use a so-called source modifier to instruct IEM 436 how to modify an operand. For example, an instruction can instruct IEM 436 to provide a negative ("−") of the operand, to provide an absolute ("abs") value of the operand, or to provide an inverted ("~") value of the operand. An inverting operation computes operation of (1.0−x) in a normalized integer representation.

After fetching the operands, IEM 436 can instruct ALU array 434, and in particular one or more ALUs 444 in ALU array 434, to perform one or more arithmetic operations specified by the decoded instruction using the fetched operands. When ALU array 434 finishes performing the arithmetic operation, ALU array 434 can communicate the resulting value(s) back to IEM 436. When IEM 436 receives the result(s) from ALU array 434, IEM 436 stores the result(s) in unified register file 432. IEM 436 can provide value(s) stored in unified register file 432 to ALU array 434 as one or more operands in connection with another arithmetic operation.

Program counter 446 is incremented to identify a next instruction in instruction module 438, which can then fetched for execution as the new "current instruction." This continues until all of the instructions are processed.

As illustrated in the example of FIG. 4, PGPE 405 can include an output module 442. Output module 442 can read data from unified register file 432 and output the data for use in another processing element 128 of graphics pipeline 108, for example. Output module 442 can output data to multiple locations, e.g., in a sequential or parallel manner, for example. Output module 442 can use ALU array 434 to perform one or more format conversions on the data before outputting the data.

In accordance with one or more embodiments, using FIG. 4 as an example, ALUs 444 are shared by input module 430, IEM 436 and output module 442, each of which is responsible to obtain the data to be operated on by an ALU 444 and send an instruction and the obtained data to the ALU 444 for execution. After completion of the operation, the ALU 444 returns the result to the module that provided the input to the ALU 444. Thus, in such an example, the ALU 444 acts as a slave responsible for executing an operation under the command of another module, which supplies the ALU 444 with the input to be manipulated by the ALU 444 and the instruction to be executed by the ALU 444. In such a case, the ALU 444 is not responsible for reading source input from register files, such as unified register files 432 and/or constant register file 440, or writing the result to a register file.

As an alternative, in accordance with one or more embodiments, the ALUs 444 are shared by input module 430, IEM 436 and output module 442, however, the ALUs 444 can be responsible for reading input source data from one or more register files, and to output results to the one or more register files. In such a case, an ALU 444 receives an instruction from another module, e.g., input module 430, IEM 436 and output module 442, reads input source data from one or more of the register files, performs one or more operations based on the instruction/command received from the input module 430, IEM 436 or output module 442, and writes the resulting data to one or more register files.

In such an alternative case, a read/write communication pathway (not shown in FIG. 4) between ALU array 434 and unified register file 432 can be used by an ALU 444 for data input/output to/from unified register file 434 based on control signal information received from the input module 430, IEM 436 or output module 442. Similarly, a read communication pathway (also not shown in FIG. 4) can be used by ALU array 434 for input of constant data from constant register file 440 to an ALU 444 based on control signal information received from the input module 430, IEM 436 or output module 442. The communication pathways can take the place of the communication pathways between constant register file 440 or unified register file 434 and one or more of input module 430, IEM 436 and output module 442 shown in FIG. 4, for example.

In accordance with one or more embodiments, ALU array 434 can execute instructions for color components and alpha components simultaneously in the same, or a different, clock cycle.

In accordance with one or more embodiments, each instruction executed using PGPE 405 can conform to a single syntax, which specifies an operation code (opcode), some number of destination registers, e.g., one or two destination registers, and some number of source registers, e.g., four source registers. The source registers specified in instructions may be registers in unified register file 432, registers in constant register file 440, or another location that stores data, for example.

An instruction set for use in accordance with embodiments of the present disclosure can comprise any number and type of instructions, each instruction can operate on a number of operands. The instruction set can include input/output, arithmetic (e.g., add, multiple, subtract, reciprocals, gamma-decoding, gamma-encoding, etc.), comparison (e.g., minimum, maximum, compare, etc.), logic (e.g., if, else, else, endif, etc.), binary (e.g., and, or, xor, not, etc.), binding, move, and end instructions.

Any of a number of varied and different graphics operations can be performed using an instruction set implemented using PGPE 405. In accordance with one or more embodiments, PGPE 405 can be configured to implement one or more blending operations using such an instruction set, as well as fragment shading operations not performed using shader unit 206.

In accordance with one or more embodiments, pixel blender 208 synchronizes color data received from the FIFO implemented using register file banks 262, with texture data. Thereafter, pixel blender 208 can perform some amount of fragment shading using a texture combining operation, e.g., using primary and secondary input pixel objects. In such a case, pixel blender 208 receives a primary input pixel object from attribute interpolator 204, e.g., via the FIFO provided using register file banks 262, and a secondary input pixel object. The secondary input pixel object can be a pixel object which specifies a texture color for a texture-mapped pixel generated using a texture filtering operation and colors of texture pixels (texels) identified as nearby texels, together with filtering factors and/or weights, which can be performed by texture engine 212, for example.

The new pixel object generated using the texture filtering operation specifies a texture color for a texture mapped pixel using colors of the nearby texels specified by the secondary input pixel object. The new pixel object can be supplied to pixel blender 208 as one of the pixel objects input to pixel blender 208 to perform a fragment shading operation. e.g., texture combining operation. In a case that pixel blender 208 is implemented using PGPE 405, PGPE 405 uses a primary input pixel object and a secondary input pixel object to perform a texture combining operation. The result can be stored for access by the pixel blender 208 in performing a pixel blending operation on the result. In accordance with one or more embodiments, PGPE 405 can be used to implement a VG_BLEND_MULTIPLY mode, a VG_BLEND_SCREEN mode, and a VG_BLEND_DARKEN mode, of the OpenVG API, or a Porter-Duff blending graphics operation, such as a Porter-Duff "source" operation, a "destination over source" operation, a "source in destination" operation, and a "destination in source" operation, by way of a some non-limiting example. PGPE 405 is relatively small in size comparing to shader unit 206, thus it may take less power consumption to perform the same amount of operations on PGPE 405.

In one or more exemplary embodiments, the functions described can be implemented in hardware, software, and/or firmware, or any combination thereof. If implemented in hardware, the functions can be implemented in one or more microprocessors, microcontrollers, digital signal processors (DSPs), application specific integrated circuits (ASICs), field programmable gate arrays (FPGAs), or the like. Such components can reside within a communication system, data writing and/or reading system, or other systems. If implemented in software, the functions can be stored on or transmitted over as one or more instructions or code on a computer-readable medium. Computer-readable media includes tangible computer storage media and communication media including any medium that facilitates transfer of a computer program from one place to another. A storage media can be any available media that can be accessed by a computer. By way of example, and not limitation, such computer-readable media can comprise RAM, Flash memory, read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. The term "computer-readable medium" can also be defined as a tangible computer program product. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method for use with a graphics processing unit comprising:
using configuration information, prior to rendering a batch of graphics primitives, to make a determination of whether or not a unified shader unit capable of performing both vertex shading and fragment shading is to bypass fragment shading;
performing vertex shading using the unified shader unit;
bypassing fragment shading by the unified shader unit based on a determination for the unified shader unit to bypass fragment shading; and
performing fragment shading using a processing unit other than the unified shader unit based on the determination for the unified shader unit to bypass fragment shading.

2. The method of claim 1, further comprising:
based on the determination for the unified shader unit to bypass fragment shading:
turning power off to a number of arithmetic logic units of the unified shader unit, and supplying power to a remainder of the arithmetic logic units, the remainder comprising a reduced number of the arithmetic logic units of the unified shader unit; and
scheduling a number of vertex shader threads to perform vertex shading using the reduced number of arithmetic logic units, wherein each vertex shader thread operates on a reduced number of vertices.

3. The method of claim 2, further comprising:
turning power off to at least one thread packing buffer and an input bus used to communicate information from the at least one thread packing buffer to the unified shader unit based on the determination for the unified shader unit to bypass fragment shading.

4. The method of claim 1, further comprising:
based on the determination for the unified shader unit to bypass fragment shading:
using a register bank of the unified shader unit as a buffer for the processing unit other than the unified shader unit, the unified shader unit's register bank being used to store pixel attribute data, which includes pixel color data, for use by the processing unit other than the unified shader unit to perform fragment shading; and forwarding texture data otherwise used by the unified shader unit to the processing unit other than the unified shader unit.

5. The method of claim 1, wherein the processing unit other than the unified shader unit comprises a pixel blender.

6. The method of claim 1, wherein the processing unit other than the unified shader unit comprises a programmable graphics processing unit, the method further comprising:
performing, by the programmable graphics processing element, texture combining and pixel blending operations.

7. The method of claim 1, wherein the unified shader unit comprises:
a plurality of arithmetic logic units; and
a scheduler configured to schedule one or more shader threads to perform at least one of vertex shading and fragment shading using the plurality of arithmetic logic units.

8. The method of claim 1,
wherein performing the vertex shading using the unified shader unit comprises processing one or more vertex shader threads with the unified shader unit, and
wherein bypassing the fragment shading by the unified shader unit comprises not processing fragment shader threads with the unified shader unit.

9. The method of claim 1, wherein the unified shader unit implements a vertex shader stage of a graphics pipeline and a fragment shader stage of the graphics pipeline, and wherein the method further comprises:
using the configuration information to make a determination of whether or not to bypass the fragment shader stage of a graphics pipeline implemented by the unified shader unit; and
bypassing the fragment shader stage of the graphics pipeline implemented by the unified shader unit based on a determination to bypass the fragment shader stage of the graphics pipeline.

10. An apparatus comprising:
a graphics processing unit comprising a command decoder configured to use configuration information, prior to the graphics processing unit rendering a batch of graphics primitives, to make a determination of whether or a not a unified shader unit capable of performing both vertex shading and fragment shading is to bypass fragment shading,
said unified shader unit being configured to:
perform vertex shading; and
bypass fragment shading based on a determination for the unified shader unit to bypass fragment shading, and
said graphics processing unit being configured to configure a processing unit other than said unified shader unit to perform fragment shading based on the determination for the unified shader unit to bypass fragment shading.

11. The apparatus of claim 10, wherein said unified shader unit comprises a plurality of arithmetic logic units, said apparatus further comprising:
a power management unit coupled to said plurality of arithmetic logic units, wherein based on the determination for the unified shader unit to bypass fragment shading, said power management unit is configured to:
turn power off to a number of said arithmetic logic units; and
supply power to a remainder of said arithmetic logic units, said remainder comprising a reduced number of said plurality of arithmetic logic units; and
a scheduler of said unified shader unit, said scheduler configured to:
schedule a number of vertex shader threads to perform the vertex shading using said reduced number of arithmetic logic units based on the determination for the unified shader unit to bypass fragment shading, wherein each vertex shader thread operates on a reduced number of vertices.

12. The apparatus of claim 11, wherein based on the determination for the unified shader unit to bypass fragment shading, said power management unit is further configured to turn a supply of power off to a thread packing buffer and an input bus used to communicate information to said unified shader unit from said thread packing buffer.

13. The apparatus of claim 10, wherein based on a determination for the unified shader unit to bypass fragment shading a register bank of said unified shader unit is used as a buffer for said processing unit other than the unified shader unit, said unified shader unit's buffer storing pixel attribute data, including pixel color data, for use by said processing unit other than the unified shader unit to perform fragment shading.

14. The apparatus of claim 10, wherein said processing unit other than the unified shader unit comprises a pixel blender, said pixel blender configured to perform fragment shading based on the determination for the unified shader unit to bypass fragment shading.

15. The apparatus of claim 10, wherein said processing unit other than the unified shader unit comprises a programmable graphics processing element.

16. The apparatus of claim 15, wherein said programmable graphics processing element is configured to perform texture combining and pixel blending operations.

17. The apparatus of claim 10, wherein the unified shader unit comprises:
a plurality of arithmetic logic units; and
a scheduler configured to schedule one or more shader threads to perform at least one of vertex shading and fragment shading using the plurality of arithmetic logic units.

18. The apparatus of claim 10, wherein the unified shader unit is further configured to process one or more vertex shader threads to perform the vertex shading, and to not process fragment shader threads to bypass the fragment shading.

19. The apparatus of claim 10,
wherein the unified shader unit implements a vertex shader stage of a graphics pipeline and a fragment shader stage of the graphics pipeline,
wherein the command decoder uses the configuration information to make a determination of whether or not to bypass the fragment shader stage of a graphics pipeline implemented by the unified shader unit, and
wherein the graphics pipeline is configured to bypass the fragment shader stage of the graphics pipeline implemented by the unified shader unit based on a determination to bypass the fragment shader stage of the graphics pipeline.

20. A computer-readable memory medium in which computer-executable program code is stored, the program code for use with a graphics processing unit and comprising code to cause the graphics processing unit to:
use configuration information, prior to rendering a batch of graphics primitives, to make a determination of whether or not a unified shader unit capable of performing both vertex shading and fragment shading is to bypass fragment shading;

perform vertex shading using the unified shader unit;
bypass fragment shading by the unified shader unit based on a determination for the unified shader unit to bypass fragment shading; and
perform fragment shading using a processing unit other than the unified shader unit based on the determination for the unified shader unit to bypass fragment shading.

21. The medium of claim 20, wherein the program code further comprises code to cause the graphics processing unit to:
based on the determination for the unified shader unit to bypass fragment shading:
turn power off to a number of arithmetic logic units of the unified shader unit, and supply power to a remainder of the arithmetic logic units, the remainder comprising a reduced number of the arithmetic logic units of the unified shader unit; and
schedule a number of vertex shader threads to perform vertex shading using the reduced number of arithmetic logic units, wherein each vertex shader thread operates on a reduced number of vertices.

22. The medium of claim 21, wherein the program code further comprises code to cause the graphics processing unit to:
turn power off to at least one thread packing buffer and an input bus used to communicate information from the at least one thread packing buffer to the unified shader unit based on the determination for the unified shader unit to bypass fragment shading.

23. The medium of claim 20, wherein the program code further comprises code to cause the graphics processing unit to:
based on the determination for the unified shader unit to bypass fragment shading:
use a register bank of the unified shader unit as a buffer for the processing unit other than the unified shader unit, the unified shader unit's register bank being used to store pixel attribute data, which includes pixel color data, for use by the processing unit other than the unified shader unit to perform fragment shading; and
forward texture data otherwise used by the unified shader unit to the processing unit other than the unified shader unit.

24. The medium of claim 20, wherein the processing unit other than the unified shader unit comprises a pixel blender.

25. The medium of claim 20, wherein the processing unit other than the unified shader unit comprises a programmable graphics processing unit, and wherein the program code further comprises code to cause the graphics processing unit to configure the programmable graphics processing unit to perform fragment shading, the fragment shading comprising texture combining and pixel blending operations.

26. The medium of claim 20, wherein the unified shader unit comprises:
a plurality of arithmetic logic units; and
a scheduler configured to schedule one or more shader threads to perform at least one of vertex shading and fragment shading using the plurality of arithmetic logic units.

27. The medium of claim 20,
wherein the code to cause the graphics processing unit to perform the vertex shading using the unified shader unit comprises code to cause the graphics processing unit to process one or more vertex shader threads with the unified shader unit, and
wherein the code to cause the graphics processing unit to bypass the fragment shading by the unified shader unit comprises code to cause the graphics processing unit to not process fragment shader threads with the unified shader unit.

28. The medium of claim 20, wherein the unified shader unit implements a vertex shader stage of a graphics pipeline and a fragment shader stage of the graphics pipeline, and wherein the program code further comprises code to cause the graphics processing unit to:
use the configuration information to make a determination of whether or not to bypass the fragment shader stage of a graphics pipeline implemented by the unified shader unit; and
bypass the fragment shader stage of the graphics pipeline implemented by the unified shader unit based on a determination to bypass the fragment shader stage of the graphics pipeline.

29. An apparatus comprising:
a graphics processing means comprising:
a command decoding means for using configuration information, prior to the graphics processing means rendering a batch of graphics primitives, to make a determination of whether or not a unified shader unit capable of performing both vertex shading and fragment shading is to bypass fragment shading,
said unified shader unit capable of performing both vertex shading and fragment shading, said unified shader unit bypassing fragment shading based on a determination of said command decoding means for said unified shader unit to bypass fragment shading, and
said graphics processing means using a processing means other than said unified shader unit for fragment shading based on the determination for the unified shader unit to bypass fragment shading.

30. The apparatus of claim 29, wherein said unified shader unit comprises a plurality of arithmetic processing means, and said apparatus further comprises:
a power management means for managing a supply of power to said plurality of arithmetic processing means, wherein based on the determination for the unified shader unit to bypass fragment shading, said power management means managing power to said plurality of arithmetic processing means, such that:
power is turned off to a number of said arithmetic processing means; and
power is supplied to a remainder of said arithmetic processing means, said remainder comprising a reduced number of said plurality of arithmetic processing means; and
a scheduling means of said unified shader unit, said scheduling means for scheduling shader threads, wherein based on the determination for said unified shader unit to bypass fragment shading, said scheduling means scheduling a number of vertex shader threads to perform the vertex shading using said reduced number of arithmetic processing means, wherein each vertex shader thread operates on a reduced number of vertices.

31. The apparatus of claim 30, wherein based on the determination for the unified shader unit to bypass fragment shading, said power management means managing a supply of power so as turn power off to a thread packing buffer and input bus used to communicate information to said shading manes from said thread packing buffer.

32. The apparatus of claim 29, wherein based on the determination for the unified shader unit to bypass fragment shading, a register bank of said unified shader unit is used as a buffer for said processing means other than said unified shader unit, said buffer storing pixel attribute data, including pixel color data.

33. The apparatus of claim 29, wherein said processing means other than said unified shader unit comprises a pixel blender.

34. The apparatus of claim 29, wherein said processing means other than said unified shader unit comprises a programmable graphics processing element, and said programmable graphics processing element is configured to perform texture combining and pixel blending operations.

35. The apparatus of claim 29, wherein the unified shader unit comprises:
- a plurality of arithmetic logic units; and
- a scheduler configured to schedule one or more shader threads to perform at least one of vertex shading or fragment shading using the plurality of arithmetic logic units.

36. The apparatus of claim 29, wherein the unified shader unit processes one or more vertex shader threads to perform the vertex shading, and does not process fragment shader threads to bypass the fragment shading.

37. The apparatus of claim 29,
- wherein the unified shader unit implements a vertex shader stage of a graphics pipeline and a fragment shader stage of the graphics pipeline,
- wherein the command decoding means uses the configuration information to make a determination of whether or not to bypass the fragment shader stage of a graphics pipeline implemented by the unified shader unit, and
- wherein the graphics pipeline bypasses the fragment shader stage of the graphics pipeline implemented by the unified shader unit based on a determination to bypass the fragment shader stage of the graphics pipeline.

* * * * *